United States Patent
Miyazawa

(10) Patent No.: US 9,904,881 B2
(45) Date of Patent: Feb. 27, 2018

(54) CONTROL DEVICE MANAGING STATE OF USE OF CARTRIDGE

(71) Applicant: Brother Kogyo Kabushiki Kaisha, Nagoya-shi, Aichi-ken (JP)

(72) Inventor: Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/252,287

(22) Filed: Aug. 31, 2016

(65) Prior Publication Data

US 2017/0061268 A1    Mar. 2, 2017

(30) Foreign Application Priority Data

Aug. 31, 2015 (JP) ................................. 2015-170185

(51) Int. Cl.
*G06K 15/00* (2006.01)
*H04N 1/00* (2006.01)

(52) U.S. Cl.
CPC ....... *G06K 15/4075* (2013.01); *G06K 15/402* (2013.01); *H04N 1/00832* (2013.01)

(58) Field of Classification Search
CPC .................................................. G06K 15/4075
See application file for complete search history.

(56) References Cited

U.S. PATENT DOCUMENTS

| 7,925,173 B2* | 4/2011 | Yamada ............... G03G 15/556 399/27 |
| 2002/0196302 A1* | 12/2002 | Saruta .................. B41J 2/17546 347/19 |
| 2003/0025742 A1* | 2/2003 | Maeda ................. B41J 2/17513 347/7 |
| 2004/0080774 A1* | 4/2004 | Owen ................... G06F 11/327 358/1.14 |
| 2007/0188539 A1* | 8/2007 | Saruta .................. B41J 2/17546 347/19 |
| 2008/0075482 A1* | 3/2008 | Hirota ................ G03G 15/0849 399/30 |

(Continued)

FOREIGN PATENT DOCUMENTS

| JP | 2003-015477 A |   | 1/2003 |
| JP | 2003015477 A | * | 1/2003 |
| JP | 2005-024767 A |   | 1/2005 |

*Primary Examiner* — Ted Barnes
(74) *Attorney, Agent, or Firm* — Banner & Witcoff, Ltd.

(57) ABSTRACT

When cartridge replacement has occurred, reference use information that is acquired for the first time after occurrence of the cartridge replacement and reference time information indicative of when the reference use information is acquired are stored. Every time target use information, which is acquired after the reference use information is acquired, is acquired, a first period, which is defined from a particular time until printing by a printing execution section using printing agent in a presently-connected cartridge is estimated to become impossible, is computed based on the target use information, target time information indicative of time when the target use information is acquired, the reference use information, and the reference time information. When the first period is shorter than a first set period, output information corresponding to the state of use of the presently-connected cartridge is outputted.

22 Claims, 9 Drawing Sheets

(56) References Cited

U.S. PATENT DOCUMENTS

| | | | | |
|---|---|---|---|---|
| 2008/0111842 A1* | 5/2008 | Hall | ............... | B41J 2/17566 347/7 |
| 2009/0142079 A1* | 6/2009 | Sato | ............... | G03G 15/0815 399/27 |
| 2009/0231367 A1* | 9/2009 | Tsuchiya | ............... | B41J 2/16517 347/7 |
| 2011/0013916 A1* | 1/2011 | Katoh | ............... | G03G 15/553 399/25 |
| 2015/0062634 A1* | 3/2015 | Saiki | ............... | G06K 15/4075 358/1.15 |
| 2016/0292772 A1* | 10/2016 | Nagasaki | ............... | G06Q 30/0633 |
| 2016/0292774 A1* | 10/2016 | Ohara | ............... | G06Q 30/0635 |
| 2016/0350637 A1* | 12/2016 | Kawana | ............... | G06K 15/4075 |

* cited by examiner

CONTROL DEVICE MANAGING STATE OF USE OF CARTRIDGE

CROSS REFERENCE TO RELATED APPLICATION

This application claims priority from Japanese Patent Application No. 2015-170185 filed Aug. 31, 2015. The entire content of the priority application is incorporated herein by reference.

TECHNICAL FIELD

The present disclosure relates to a non-transitory computer readable storage medium storing a control program for managing a state of use of a cartridge that stores printing agent for use in printing.

BACKGROUND

An image forming apparatus uses developer to form an image onto a recording medium. There has been proposed a conventional image forming apparatus that detects a residual amount of developer. A linear function is derived based on both of: a predetermined initial filling amount of the developer, whose data is previously stored in the image forming apparatus as reference use information; and a residual amount of the developer that actually remains after a lapse of a prescribed number of days. Based on the linear function, a specific date on which printing is estimated to become impossible is computed.

SUMMARY

The above-described image forming apparatus can estimate, to some degree, when printing will become impossible. Thus, the image forming apparatus can estimate the length of a printable period during which the image forming apparatus will be able to perform printing. However, the actual initial state of the cartridge that should be used to compute the length of the printable period differs between, for example, when a large capacity cartridge filled with a large amount of printing agent is used and when a standard capacity cartridge filled with a standard amount of printing agent is used. Further, when a cartridge newly connected to the image forming apparatus is one that has already been used in another printer and therefore accommodates only a small amount of residual printing agent, the actual initial state of the cartridge differs from the reference use information that is used in computing the length of the printable period. It is conceivable that a server is provided separately from a printer, and the server is configured to acquire an amount of the printing agent from the printer and to compute the length of the printable period. Also in such a conceivable system, the reference use information used in computing the printable period may differ from the actual initial state of the cartridge.

Thus, the reference use information used in computing the length of the printable period may differ from the actual initial state of the cartridge. The length of the printable period cannot be computed adequately.

In view of the above-described problems, an object the present disclosure is to adequately compute the length of the printable period even when the actual initial state of the cartridge changes.

According to one aspect, a non-transitory computer readable storage medium stores a set of program instructions for a control device. The program instructions, when executed by a computer provided in the control device, cause the control device to perform:

repeatedly acquiring use information indicative of a state of use of a cartridge that is presently connected to a connection section so as to be used by a printing execution section, the cartridge being configured to accommodate printing agent therein, the printing execution section being configured to execute printing by using the printing agent accommodated in the presently-connected cartridge;

acquiring specific information from a supply source of the acquired use information, the specific information being used for determining whether cartridge replacement has occurred;

determining, by using the acquired specific information, whether cartridge replacement has occurred;

when it is determined that cartridge replacement has occurred, storing in a storage section reference use information and reference time information in association with each other, the reference use information being such use information that is acquired for the first time after the cartridge replacement has occurred, the reference time information being indicative of time when the reference use information is acquired;

every time when target use information is acquired, computing a length of a first period, the target use information being such use information that is acquired after the reference use information is acquired, the first period being defined as a period of time defined from a particular time until printing by the printing execution section using the printing agent in the presently-connected cartridge is estimated to become impossible, the length of the first period being computed based on the target use information, target time information, the reference use information that is stored in the storage section, and the reference time information that is stored in the storage section, the target time information being indicative of time when the target use information is acquired; and when the length of the first period is shorter than a length of a first set period, outputting output information corresponding to the state of use of the presently-connected cartridge.

According to another aspect, a non-transitory computer readable storage medium stores a set of program instructions for a control device. The program instructions, when executed by a computer provided in the control device, cause the control device to perform:

acquiring use information indicative of a state of use of a cartridge that is presently connected to a connection section so as to be used by a printing execution section, the cartridge being configured to accommodate printing agent therein, the printing execution section being configured to execute printing by using the printing agent accommodated in the presently-connected cartridge;

acquiring specific information from a supply source of the acquired use information, the specific information being used for determining whether cartridge replacement has occurred;

determining, by using the acquired specific information, whether cartridge replacement has occurred;

when it is determined that cartridge replacement has occurred, storing in a storage section reference use information and reference time information in association with each other, the reference use information being such use information that is acquired for the first time after the cartridge replacement has occurred, the reference time information being indicative of time when the reference use information is acquired;

when target use information is acquired, computing a length of a first period, the target use information being such use information that is acquired after the reference use information is acquired, the first period being defined as a period of time defined from a particular time until printing by the printing execution section using the printing agent in the presently-connected cartridge is estimated to become impossible, the length of the first period being computed based on the target use information, target time information, the reference use information that is stored in the storage section, and the reference time information that is stored in the storage section, the target time information being indicative of time when the target use information is acquired; and when at least one of first and second conditions is satisfied, outputting output information corresponding to the state of use of the presently-connected cartridge. The first condition is that the length of the first period is shorter than a length of a first set period. The second condition is that the state of use of the presently-connected cartridge exceeds a prescribed use limit, irrespective of whether the length of the first period is shorter than the first set period.

According to still another aspect, a control device includes: a storage section; and a control section. The control section is configured to perform:

repeatedly acquiring use information indicative of a state of use of a cartridge that is presently connected to a connection section so as to be used by a printing execution section, the cartridge being configured to accommodate printing agent therein, the printing execution section being configured to execute printing by using the printing agent accommodated in the presently-connected cartridge;

acquiring specific information from a supply source of the acquired use information, the specific information being used for determining whether cartridge replacement has occurred;

determining, by using the acquired specific information, whether cartridge replacement has occurred;

when it is determined that cartridge replacement has occurred, storing in the storage section reference use information and reference time information in association with each other, the reference use information being such use information that is acquired for the first time after the cartridge replacement has occurred, the reference time information being indicative of time when the reference use information is acquired;

every time when target use information is acquired, computing a length of a first period, the target use information being such use information that is acquired after the reference use information is acquired, the first period being defined as a period of time defined from a particular time until printing by the printing execution section using the printing agent in the presently-connected cartridge is estimated to become impossible, the length of the first period being computed based on the target use information, target time information, the reference use information that is stored in the storage section, and the reference time information that is stored in the storage section, the target time information being indicative of time when the target use information is acquired; and when the length of the first period is shorter than a length of a first set period, outputting output information corresponding to the state of use of the presently-connected cartridge.

BRIEF DESCRIPTION OF THE DRAWINGS

The particular features and advantages of the disclosure will become apparent from the following description taken in connection with the accompanying drawings, in which:

FIGS. 3-7 are graphs showing relationships between the ink residual amount M and time T, wherein FIG. 3 shows how to compute a printable period, FIG. 4 shows a case where the computed printable period is shorter than a set period, FIG. 5 shows a case where the computed printable period is longer than the set period, but an ink residual amount is smaller than a threshold value, FIG. 6 shows a case, in which after cartridge replacement occurs, the ink residual amount continues being reduced for three days, and then stops being reduced, and FIG. 7 shows a case, in which a new cartridge is ordered after an order inhibiting period has been elapsed;

DETAILED DESCRIPTION

Figure 1:
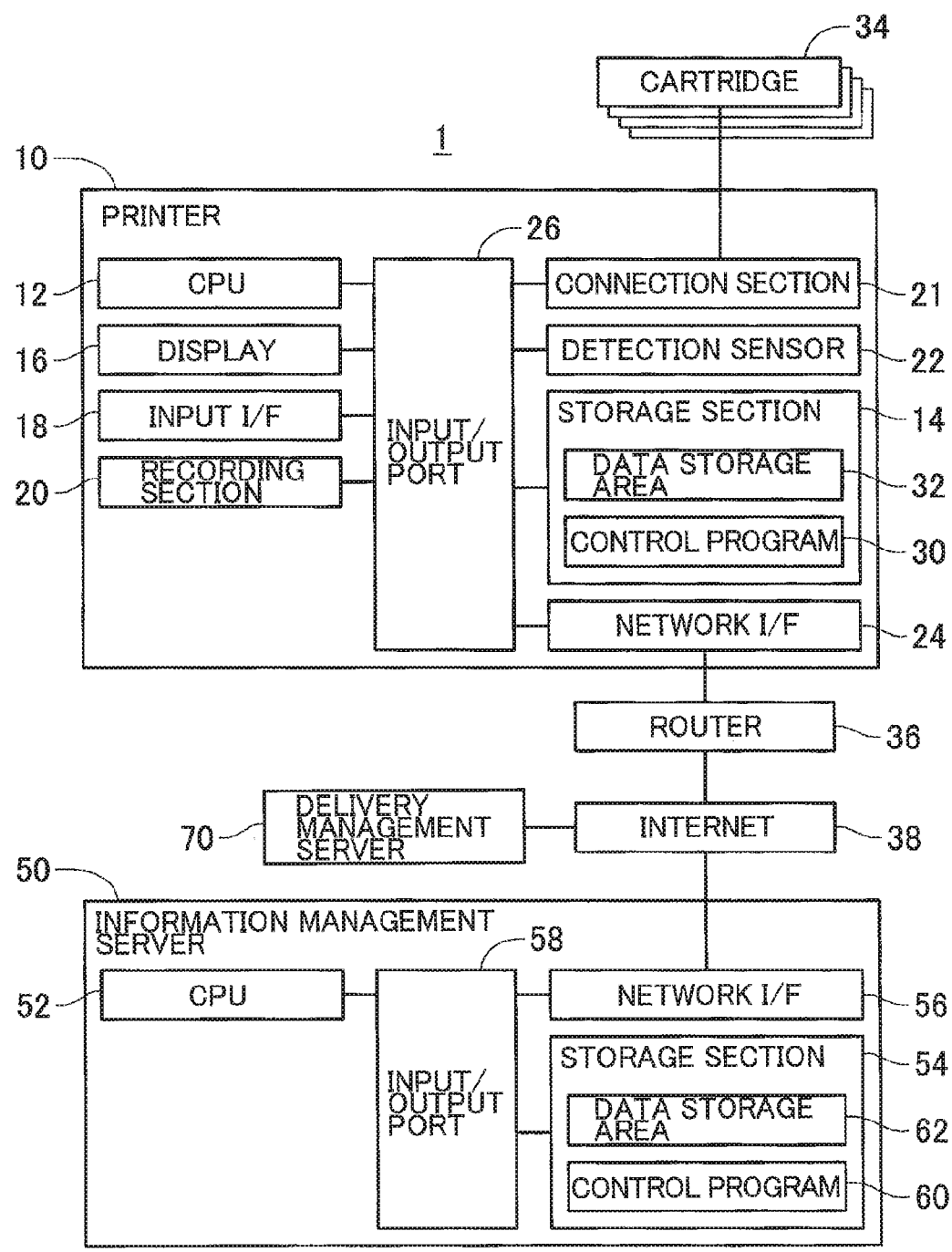
FIG. 1 is a block diagram of a communication system according to a first embodiment.

A communication system according to embodiments will be described while referring to the accompanying drawings wherein like parts and components are designated by the same reference numerals to avoid duplicating description.

<Configuration of Communication System>

FIG. 1 is a block diagram of a communication system 1 exemplified as a first embodiment of the present disclosure. The communication system 1 includes a printer 10, an information management server 50, and a delivery management server 70. Printer 10 is an example of a printing device. Information management server 50 is an example of a control device and an example of a server device. The delivery management server 70 is an example of a delivery management server.

The printer 10 mainly includes a CPU (Central Processing Unit) 12, a storage section 14, a display 16, an input interface (input I/F) 18, a recording section 20, a connection section 21, a detection sensor 22, and a network interface (network I/F) 24. These components are capable of communicating with one another via an input/output port 26. The recording section 20 is an example of a printing execution section. The connection section 21 is an example of a connection section.

The CPU 12 executes processing in accordance with a control program 30 stored in the storage section 14. The control program 30 is a program for executing a printing process. The storage section 14 is a combination of a RAM (Random Access Memory), a ROM (Read Only Memory), a flash memory, an HDD (Hard Disk Drive) and a buffer provided to the CPU 12. Further, the storage section 14 has a data storage area 32. The data storage area 32 is an area for storing data required to execute the control program 30.

The display 16 displays various screens on the basis of inputted image data. The display 16 may be, but not limited to, an LCD (Liquid Crystal Display) or an organic EL (Electro Luminescence). The input I/F 18 includes keys for a user to execute respective functions of the printer 10. The input I/F 18 may be, for example, a touch panel integrally formed with the display 16 and receives a user operation for icons displayed on the display 16. The input I/F 18 may have hard keys instead of the touch panel.

The recording section 20 serves as a print mechanism and is, for example, an inkjet head. The CPU 12 inputs a drive signal to the recording section 20. When the recording section is an inkjet head, nozzles eject ink (an example of a printing agent) in response to the inputted drive signal.

The connection section 21 is formed in the housing of the printer 10 such that a cartridge 34 filled with ink to be used by the recording section 20 can be connected to the connection section 21. When cartridge replacement occurs, a cartridge 34 that is connected to the connection section 21 is removed from the connection section 21, and another cartridge 34 is newly connected to the connection section 21. The cartridge is an example of a cartridge. The connection section 21 can be connected with a plurality of cartridges 34 for a plurality of different ink colors, respectively. The detection sensor 22 detects, for each ink color, the residual amount of ink in the cartridge 34 that is connected to the connection section 21.

The network I/F 24 is capable of communicating with an external device and is connected to the Internet 38 via a router 36. The internet 38 is connected to the information management server 50 and the delivery management server 70. With this configuration, the printer 10 can perform data communication with the information management server 50 and the like via the network I/F 24.

The information management server 50 mainly includes a CPU 52, a storage section 54, and a network interface (network I/F) 56. These components are capable of communicating with one another via an input/output port 58. The CPU 52 is an example of a computer and an example of a control section. The storage section 54 is an example of a non-transitory computer readable storage medium.

The CPU 52 executes processing based on a control program 60 stored in the storage section 54. The control program 60 is a program for managing information on ink used in the printer 10. The control program 60 is an example of program instructions. Hereinafter, the CPU 52 that executes the control program 60 is also referred to simply by a program name thereof. For example, "control program 60" may represent "CPU 52 that executes the control program 60". The storage section 54 is a combination of a RAM, a ROM, a flash memory, an HDD, and a buffer provided to the CPU 52. The storage section 54 further has a data storage area 62. The data storage area 62 is an area for storing data required to execute the control program 60. The control program 60 is an example of a control program. The data storage area 62 is an example of a storage section.

The network I/F 56 communicates with an external device, and is connected to the delivery management server 70 via the Internet 38 and to the printer 10 via the router 36 and the Internet 38. With this configuration, the information management server 50 can perform data communication with the printer 10 and the delivery management server 70 via the network I/F 56.

<Ink Management Utilizing Communication System>

In the communication system 1, the information management server 50 manages a state how ink is used by the printer 10. When the residual amount of ink is reduced as a result of use of ink by the printer 10, the information management server 50 orders a new cartridge for ink whose amount is reduced. In response to the ordering of a new cartridge, the new cartridge is delivered to a user of the printer 10. Because the information management server 50 performs both of management and ordering of a cartridge, the user of the printer 10 can save time and effort in the management of the residual amount of ink and purchase of the cartridge. Accordingly, the system 1 can improve the user's convenience.

Specifically, the user of the printer 10 makes a contract with a manufacturer of the printer 10 who provides a cartridge management/order placement service. The cartridge management/order placement service is a service to which the user subscribes for his/her printer. When the service contract is made, user information for identifying the user, printer information for identifying the printer under contract, and ordering information concerning ordering of cartridges for the printer are registered. The user information is information concerning the name, address, and the like of the user who serves as a cartridge delivery destination. The printer information is unique information of the printer under contract and includes a serial ID of the printer. The ordering information is information for identifying cartridges to be delivered to the user according to the contract and is, for example, a model number of a cartridge of each ink color to be ordered. It is noted that both a large capacity cartridge and a standard capacity cartridge can be used as a cartridge 34 in the printer 10. Therefore, the ordering information includes information identifying whether a cartridge to be ordered is one of the large and standard capacity cartridges.

After the contract for the management/order placement service is made, the user information, printer information, and ordering information are stored in association with one another in a web server of the manufacturer of the printer 10. In the communication system 1, the information management server 50 is the web server of the printer manufacturer. So, the user information, printer information, and ordering information are stored in the data storage area 62 of the information management server 50. When the printer 10 is turned ON, communication is executed between the printer 10 and the information management server 50 based on the user information thus stored in the data storage area 62.

After communication is established between the printer 10 and the information management server 50 (M100 in FIG. 2), the printer 10 repeatedly transmits cartridge information to the information management server 50 at preset timings (M102). Specifically, for example, the printer 10 transmits the cartridge information to the information management server 50 at a predetermined time every day.

The cartridge information includes ink information (an example of use information), replacement time number information (an example of specific information), and status information. At each preset timing, the printer 10 transmits the cartridge information (that is, the ink information, replacement time number information, and status information) in a single communication session.

It is noted that the printer 10 transmits its own serial ID together with the cartridge information to the information management server 50.

The printer 10 periodically detects the ink residual amount of the cartridge 34 that is presently connected to the connection section 21 by using the detection sensor 22. The ink information is indicative of the thus detected ink residual amount.

The replacement time number information is indicative of the number of times by which cartridge replacement has occurred. The printer 10 counts the number of replacement times by detecting occurrence of the cartridge replacement. More specifically, after a user has completed cartridge replacement, the user inputs, into the input I/F 18, information indicating that the cartridge replacement has been completed. So, the printer 10 increments the number of replacement times by one every time when the information indicating completion of cartridge replacement has been inputted at the input I/F 18. The replacement time number information indicates the number of replacement times thus counted by the printer 10.

Alternatively, in one modification, each cartridge 34 is provided with a new cartridge detection mechanism that invalidates detection by the printer 10 when the cartridge 34 is used for the first time after having been connected to the connection section 21. Every time the printer 10 detects the new cartridge detection mechanism provided in a cartridge 34 that is newly mounted in the printer 10, the printer 10 increments the number of replacement times by one.

Alternatively, according to another embodiment, the following configuration can be employed. That is, when the ink residual amount detected by the detection sensor 22 is increased, it can be considered that a cartridge having a small ink residual amount is removed from the connection section 21, and a new cartridge is connected to the connection section 21. Accordingly, every time the ink residual amount detected by the detection sensor 22 is increased, the printer 10 increments the number of replacement times by one.

The status information is indicative of whether the state of use of a cartridge 34 that is presently connected to the connection section 21 (which will be referred to also as "presently-connected cartridge 34" hereinafter) has exceeded a prescribed use limit and therefore the presently-connected cartridge 34 is nearly empty. In other words, the status information is either one of near-empty information and not-near-empty information. The near-empty information is an example of excess information. More specifically, when the ink residual amount detected by the detection sensor 22 is smaller than a prescribed threshold value, the printer 10 determines that the state of use of the cartridge 34 has exceeded the prescribed use limit and that ink is nearly empty. Accordingly, the printer 10 sets the status information to near-empty information. On the other hand, when the detected ink residual amount is equal to or larger than the threshold value, the printer 10 determines that a certain degree of ink remains. Accordingly, the printer 10 sets the status information to not-near-empty information.

The printer 10 manages: the ink residual amount; replacement time number information; and status information, for each of the ink colors of the cartridges 34 that are connected to the connection section 21. Accordingly, the cartridge information includes, for each ink color, the ink information (ink residual amount), replacement time number information, and status information.

When the information management server 50 receives cartridge information of the presently-connected cartridge 34 for the first time after communication was established between the printer 10 and the information management server 50, the information management server 50 stores the ink information included in the cartridge information as reference ink information in the data storage area 62 (M104). The reference ink information is an example of reference use information. The information management server 50 also stores, in the data storage area 62, time information indicative of the time when the information management server 50 received the cartridge information of the presently-connected cartridge for the first time after establishment of the communication. The information management server 50 stores the time information as reference time information. The reference time information is an example of reference time information. The information management server 50 stores, in the data storage area 62, the reference ink information and the reference time information in association with each other and with respect to the serial ID that the information management server 50 received together with the cartridge information.

As described above, the printer 10 repeatedly transmits the cartridge information to the information management server 50 at the preset timings (M106). So, the information management server 50 may receive cartridge information of the presently-connected cartridge 34 for the second or subsequent times after communication was established between the printer 10 and the information management server 50. In other words, the information management server 50 may receive cartridge information of the presently-connected cartridge 34 after the information management server 50 stored the reference ink information and the reference time information for the same cartridge 34 in the data storage area 62. The ink information included in the cartridge information that was received for the second or subsequent times for the presently-connected cartridge will be referred to as target ink information. The target ink information is an example of target use information. The time information indicating the time when the cartridge information of the presently-connected cartridge 34 was received for the second or subsequent time will be referred to as target time information. The target time information is an example of target time information.

When the information management server 50 receives cartridge information of the presently-connected cartridge 34 for the second or subsequent times after establishment of the communication, the information management server 50 determines, based on the received cartridge information, whether or not a first ordering condition is satisfied (M108). More specifically, based on the temporal change in the ink residual amount indicated by the ink information included in the cartridge information, the information management server 50 computes the length of a period defined from when the information management server 50 received the cartridge information for the presently-connected cartridge 34 at the latest and until printing is expected to become impossible as a result of the use of ink in the presently-connected cartridge 34. That is, the information management server 50 computes the length of a period during which print processing using the ink in the presently-connected cartridge 34 (hereinafter, sometimes referred to as "printable period") is expected to be possible. The printable period is an example of a first period. The time when the information management server 50 received the cartridge information for the presently-connected cartridge 34 at the latest is an example of a particular time. In other words, the time indicated by the target time information is an example of the particular time.

Figure 3:
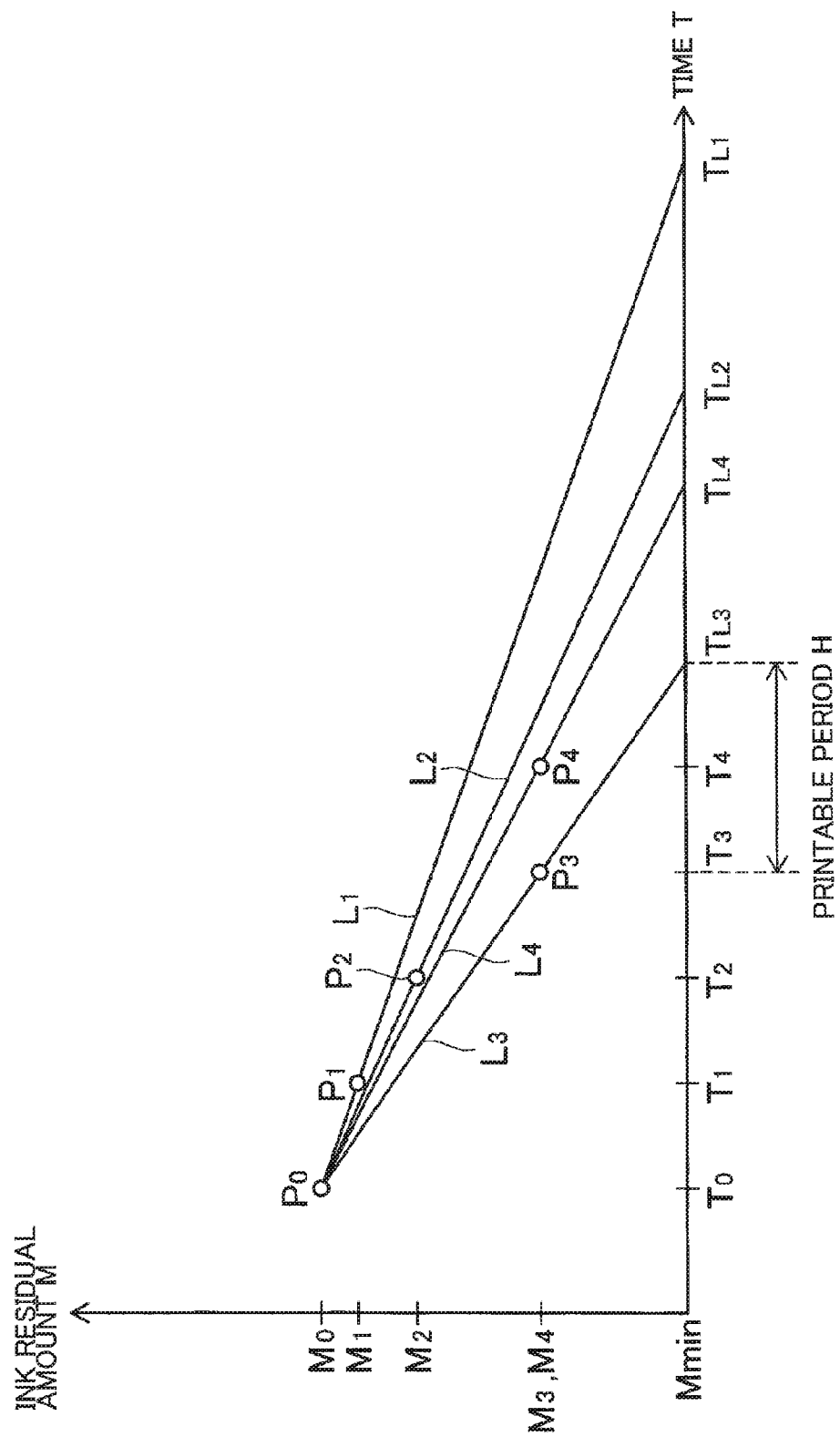

Specifically, as illustrated in FIG. 3, a coordinate system is defined by: an ink residual amount M defined by ink information included in the cartridge information; and a time T defined by time information as indicative of time when the cartridge information was received. In the coordinate system, a coordinate point $P_0$ is plotted as a combination of: an ink residual amount $M_0$ indicated by the reference ink information stored in M104; and a time $T_0$ defined by the reference time information stored also in M104. When cartridge information was received a day (first day) after reception of the cartridge information that includes the reference ink information, a coordinate point $P_1$ is additionally plotted as a combination of: an ink residual amount $M_1$ indicated by the target ink information included in the cartridge information received a day after reception of the reference ink information; and a time $T_1$ (=first day) defined by the target time information as indicative of the time when the cartridge information including the target ink information was received. Then, a linear function $L_1$ passing the coordinate points $P_0$ and $P_1$ is computed.

When cartridge information was received two days (second day) after reception of the reference ink information, a coordinate point $P_2$ is additionally plotted as a combination of: an ink residual amount $M_2$ indicated by the target ink information included in the cartridge information received two days after reception of the reference ink information; and a time $T_2$ (=second day) defined by target time information as indicative of the time when the cartridge information including the target ink information was received. Then, a linear function $L_2$ passing the coordinate points $P_0$ and $P_2$ is computed.

To summarize, when cartridge information was received N days (N-th day) after reception of the cartridge information including the reference ink information, a coordinate point $P_N$ is plotted as a combination of: an ink residual amount $M_N$ indicated by the target ink information included in the cartridge information received N days after reception of the reference ink information; and a time $T_N$ (=Nth day) defined by target time information as indicative of the time when the cartridge information including the target ink information was received. Then, a linear function $L_N$ passing the coordinate points $P_0$ and $P_N$ is computed.

Then, based on the computed linear function $L_N$, a final time $T_{LN}$, at which the ink remaining amount is estimated to reach a prescribed minimum ink residual amount $M_{min}$, is computed. The prescribed minimum ink residual amount $M_{min}$ is a minimum amount of ink that is required to remain in the cartridge 34 to perform print processing. Thus, the final time $T_{LN}$ means a final time until which print processing can be performed using the ink of the cartridge 34. Then, the length of a printable period H is computed by subtracting, from the computed final time $T_{LN}$, the time $T_N$ at the coordinate point $P_N$ that is used in computing the linear function $L_N$. For example, when cartridge information was received three days after reception of the cartridge information including the reference ink information, a final time $T_{L3}$ is computed based on a computed linear function $L_3$, and the length of the printable period H is computed by subtracting the time $T_3$ from the computed final time $T_{L3}$.

After computation of the length of the printable period H, the information management server 50 determines whether or not the length of the printable period H is shorter than the length of a set period D. The set period D is an example of a first set period. The set period D is a sum of a predetermined period and a delivery period that is required to deliver a cartridge to a user of the printer 10. The length of the set period D is previously stored in the data storage area 62. The length of the predetermined period added to the delivery period is a comparatively short period (e.g., one day). The length of the set period D is set dependently on a delivery destination address. That is, the shorter a delivery distance between a delivery source address and a delivery destination address, the shorter the delivery period, so that the set period D is set shorter; on the other hand, the longer the delivery distance, the longer the delivery period, so that the set period D is set longer. Alternatively, in one modification, the same length of the set period D may be set irrespective of the delivery destination address.

Figure 4:
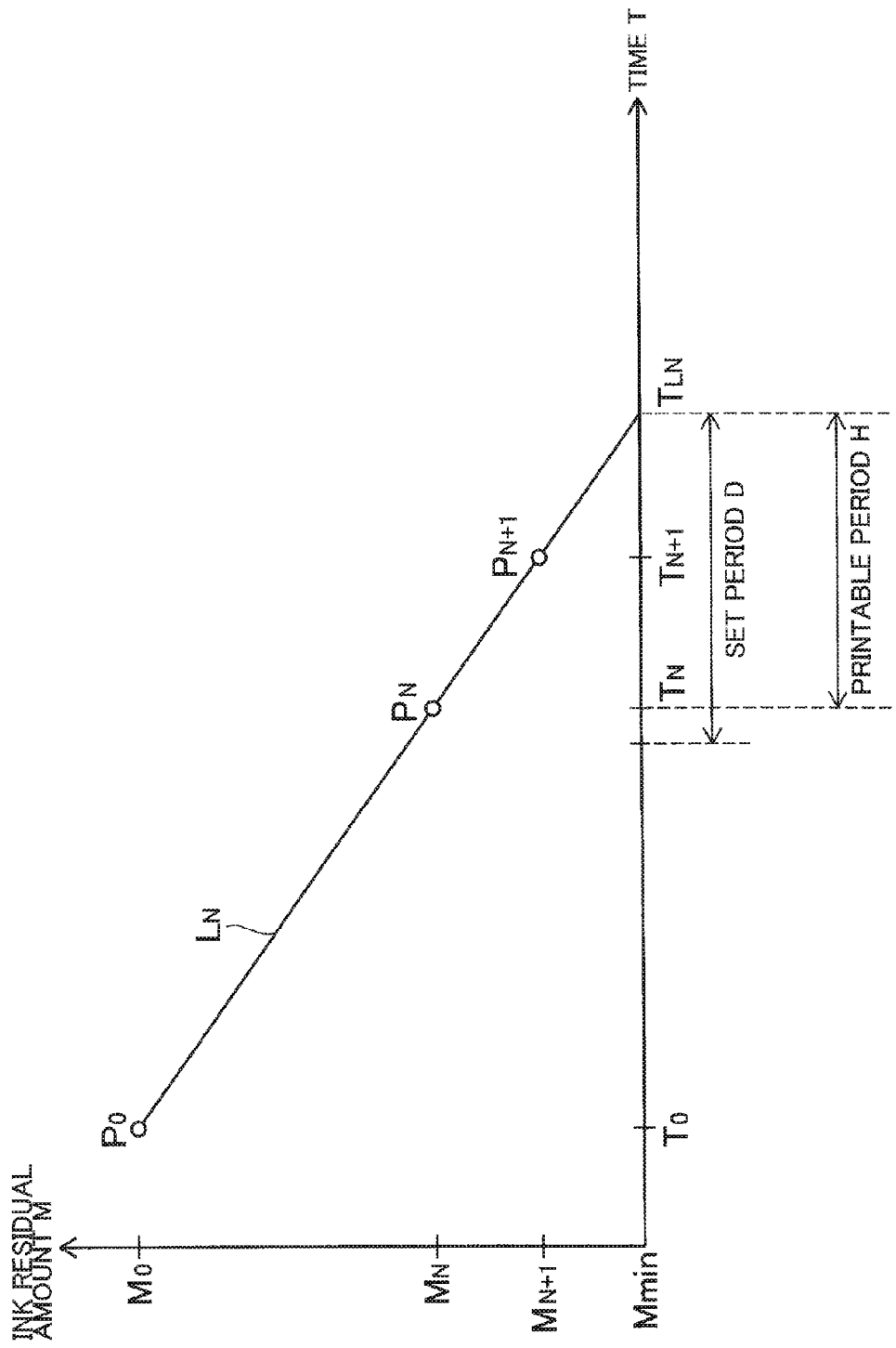

It is considered that if a new cartridge is ordered when it is determined that the length of the printable period H is shorter than the set period D as illustrated in FIG. 4, the new cartridge can arrive at the user shortly before the final time $T_{LN}$. This is because the set period D is a sum of the delivery period and the comparatively short period. According to the present embodiment, therefore, when the information management server 50 determines that the printable period H is shorter than the set period D, the information management server 50 determines that the first ordering condition is satisfied (YES in M108 in FIG. 2). It is noted that the information management server 50 performs determination as to whether the first ordering condition is satisfied, for each ink color, that is, for each of the cartridges 34 that are presently connected to the connection section 21.

As described above, the user information, printer information, and ordering information are stored in association with each other in the data storage area 62 of the information management server 50. So, the information management server 50 extracts, from the data storage area 62, the user information and ordering information, both of which correspond to the serial ID (printer information) that the information management server 50 received together with the cartridge information that was used to perform determination concerning the first ordering condition. From the extracted ordering information, the information management server 50 specifies a model number of a cartridge corresponding to an ink color, to which the first ordering condition is satisfied. Then, the information management server 50 transmits the specified cartridge model number and the extracted user information as well as a cartridge ordering command to the delivery management server 70 (M110). The cartridge ordering command is an example of output information. In response to the cartridge ordering command, the delivery management server 70 performs a process for arranging dispatch of cartridge of the received model number to a user specified by the user information. Because the first ordering condition is that the length of the printable period H is shorter than the set period D, a cartridge can be ordered at an adequate timing.

Figure 5:
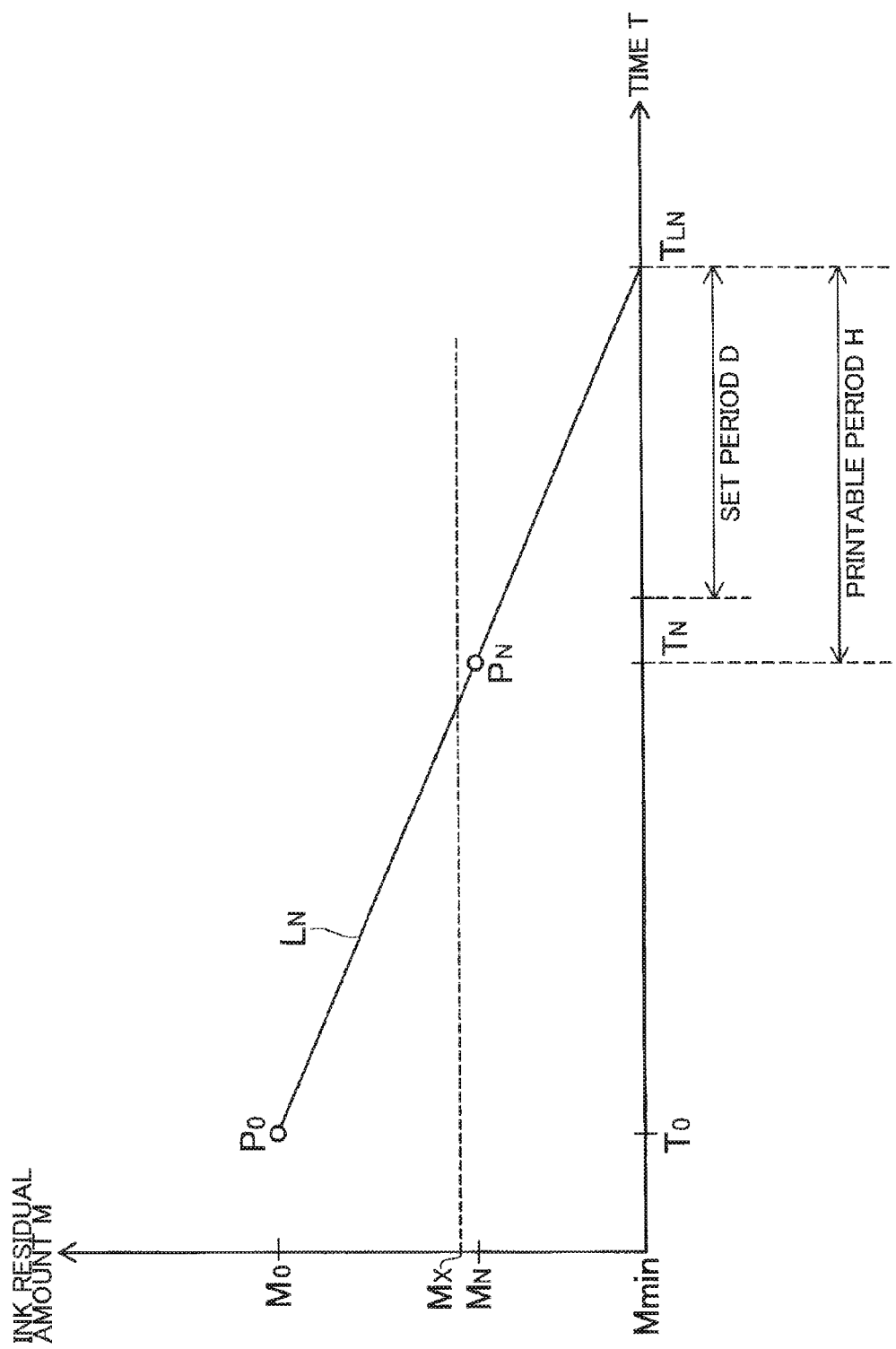

It is noted that the information management server 50 orders a cartridge even when the printable period H is equal to or longer than the set period D. That is, the information management server 50 orders a cartridge also when a second ordering condition different from the first ordering condition is satisfied. Now assume that when cartridge information was received N days after cartridge information including the reference ink information was received, the coordinate point $P_N$ specified by an ink residual amount $M_N$ and time $T_N$ is plotted as illustrated in FIG. 5. The ink residual amount $M_N$ is indicated by the ink information included in the cartridge information that was received N days after reception of the reference ink information. The time $T_N$ (=N-th day), at which the cartridge information was received, is indicated by time information. Then, based on the linear function $L_N$ passing the coordinate points $P_0$ and $P_N$, the final time $T_{LN}$ is computed, and the length of the printable period H indicative of a difference between the final time $T_{LN}$ and time $T_N$ is computed. The length of the printable period H defined for the coordinate point $P_N$ is longer than the set period D. However, the ink residual amount $M_N$ at the coordinate point $P_N$ is comparatively small.

If the printer 10 receives many print jobs at a time when the ink residual amount $M_N$ is small as described above, the printer 10 will become unable to perform printing due to ink shortage. Therefore, a new cartridge needs to be ordered when the ink residual amount $M_N$ indicated by the ink information included in the received cartridge information becomes smaller than a prescribed threshold value $M_X$. Thus, every time the detection sensor 22 detects the ink residual amount of the cartridge 34, the printer 10 determines whether or not the detected ink residual amount is smaller than the threshold value $M_X$. When the detected ink residual amount is smaller than the threshold value $M_X$, the printer 10 sets the status information to the near-empty information as described above. On the other hand, when the detected ink residual amount is equal to or larger than the threshold value $M_X$, the printer 10 sets the status information to the not-near-empty information.

The printer 10 transmits the status information, as being included in the cartridge information, to the information management server 50. Upon reception of the cartridge information, the information management server 50 determines whether the status information included in the received cartridge information is near-empty information or not-near-empty information. When the status information is near-empty information, the information management server 50 determines that the second ordering condition is satisfied and orders a new cartridge. On the other hand, when the status information is not-near-empty information, the information management server 50 determines that the second ordering condition is not satisfied and that it is unnecessary to order a new cartridge. Thus, the second ordering condition is that the status information included in the cartridge information is near-empty information.

In this way, when the near-empty information is received as the status information, or when the printable period H computed using the received ink information is shorter than the set period D, the information management server 50 determines that one of the first and second ordering conditions is satisfied and orders a new cartridge. On the other hand, when the not-near-empty information is received as the status information and the printable period H computed using the received ink information is equal to or longer than the set period D, the information management server 50 determines that none of the first and second ordering conditions are satisfied (NO in M108 in FIG. 2) and does not order a new cartridge. In such a case, the information management server 50 will perform determination concerning the first and second ordering conditions by using the cartridge information that will be received for the next time.

The information management server 50 may erroneously perform double ordering of a cartridge if the information management server 50 performs determination concerning the first ordering condition, immediately after having ordered a new cartridge. Now assume that as illustrated in FIG. 4, the length of the printable period H is computed based on the ink residual amount $M_N$, which was received N days after reception of the reference ink information. The thus computed length of the printable period H is shorter than the set period D. Therefore, a new cartridge is ordered on the N-th day after the reference ink information was received. The ordered new cartridge does not arrive at the user on the next day of the day on which the order placement was executed, that is, on the (N+1)-th day after the reference ink information was received. This is because the delivery period is generally one or two days or more. That is, cartridge replacement is not executed on the (N+1)-th day. Accordingly, the ink residual amount $M_{N+1}$, which was received on the (N+1)-th day, is equal to or smaller than the ink residual amount $M_N$. In such a case, the printable period H computed based on the ink residual amount $M_{N+1}$ becomes shorter than the set period D. Accordingly, the first ordering condition is satisfied, and a new cartridge is ordered also on the (N+1)-day. This results in double order because a new cartridge was ordered the day before.

In order to prevent the above-described problem from happening, when the information management server 50 receives cartridge information after having ordered a new cartridge (M112), the information management server 50 uses the replacement time number information included in the received cartridge information to determine whether or not cartridge replacement has been completed (M114). The replacement time number information represents the number of times, by which cartridge replacement has occurred. When the number of replacement times indicated by the replacement time number information has increased, the information management server 50 determines that cartridge replacement has been completed. On the other hand, when the number of replacement times has not changed, the information management server 50 determines that cartridge replacement has not yet been completed. While cartridge replacement has not yet been completed (NO in M114), the information management server 50 does not perform determination as to the first ordering condition by using the received cartridge information, but waits for receipt of cartridge information that will arrive for the next time. After having ordered a new cartridge, every time the information management server 50 receives cartridge information, the information management server 50 determines whether cartridge replacement has been completed. This can prevent the information management server 50 from performing the double ordering for the cartridge.

When cartridge replacement has occurred (YES in M114), in M116, the information management server 50 updates the reference ink information stored in the data storage area 62 to the ink information included in the cartridge information that the information management server 50 received at the latest in M112. The information management server 50 also updates the reference time information stored in the data storage area 62 to time information indicative of the time when the cartridge information was received at the latest. Thereafter, every time cartridge information is newly received (M106), the information management server 50 determines whether at least one of the first and second ordering conditions is satisfied (M108). The information management server 50 can thus monitor the ink residual amount of the presently-connected cartridge 34.

Figure 6:
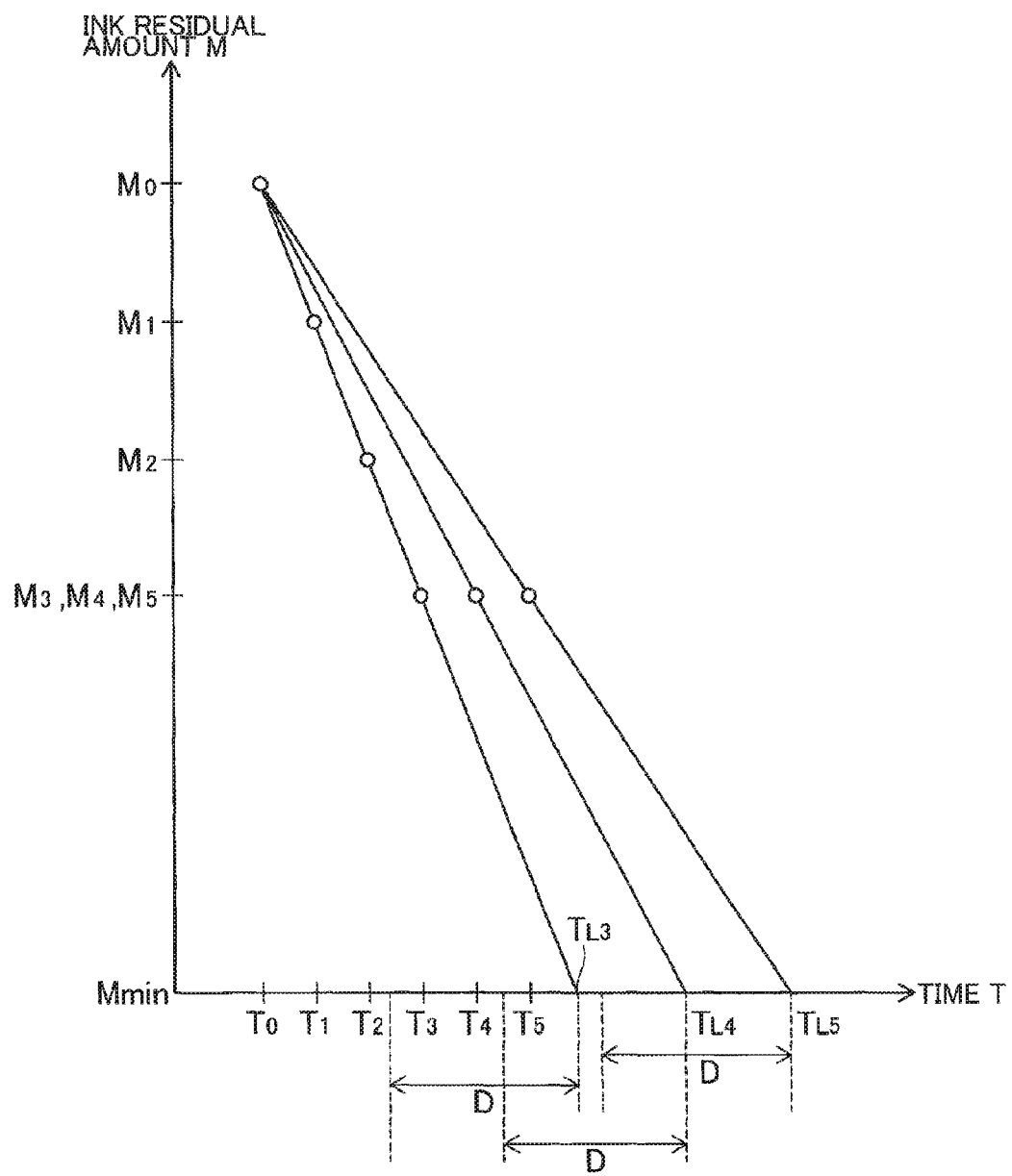

The frequency, at which the printer 10 executes the print processing, is unstable for a few days after a cartridge 34 was newly connected to the connection section 21. Accordingly, after a cartridge 34 is newly connected to the connection section 21, it is difficult to adequately determine when to order a cartridge next. Now assume that, as illustrated in FIG. 6, after a cartridge 34 is newly connected to the connection section 21, print processing is performed in three days, that is, on the first through third days. Accordingly, the ink residual amount M is reduced from $M_0$ through $M_1$ to $M_3$. The length of the printable period H ($=T_{L3}-T_3$) computed based on the ink residual amount $M_3$ becomes shorter than the set period D. In such a case, the first ordering condition is satisfied, so that a new cartridge needs to be ordered.

However, no print processing is performed on the fourth and fifth days. The length of the printable period H ($=T_{L4}-T_4$) computed based on the ink residual amount $M_4$ becomes equal to or longer than the set period D. The length of the printable period H ($=T_{L5}-T_5$) computed based on the ink residual amount $M_5$ also becomes equal to or longer than the set period D. The first ordering condition is not satisfied and therefore no cartridges need to be ordered on the fourth and fifth days. If a cartridge 34 were ordered on the third day, the thus ordered cartridge will arrive at the user when the sufficient amount of ink remains in the presently-connected cartridge 34.

In view of the above problem, a period of several days (in the present embodiment, three days) after a cartridge 34 was newly connected to the connection section 21 is set as an order inhibiting period. During the order inhibiting period, even when the information management server 50 receives cartridge information, the information management server 50 does not compute the length of the printable period H using the ink information included in the received cartridge information, and does not determine whether the first ordering condition is satisfied. Only after the elapsed time from when a cartridge 34 was newly connected to the connection section 21 exceeds the order inhibiting period, the information management server 50 performs determination concerning the first ordering condition by using the received ink information. The information management server 50 can therefore order a new cartridge at an adequate timing. The elapsed time from when a cartridge 34 was newly connected to the connection section 21 is an example of a second period. The order inhibiting period is an example of a second set period.

Figure 7:
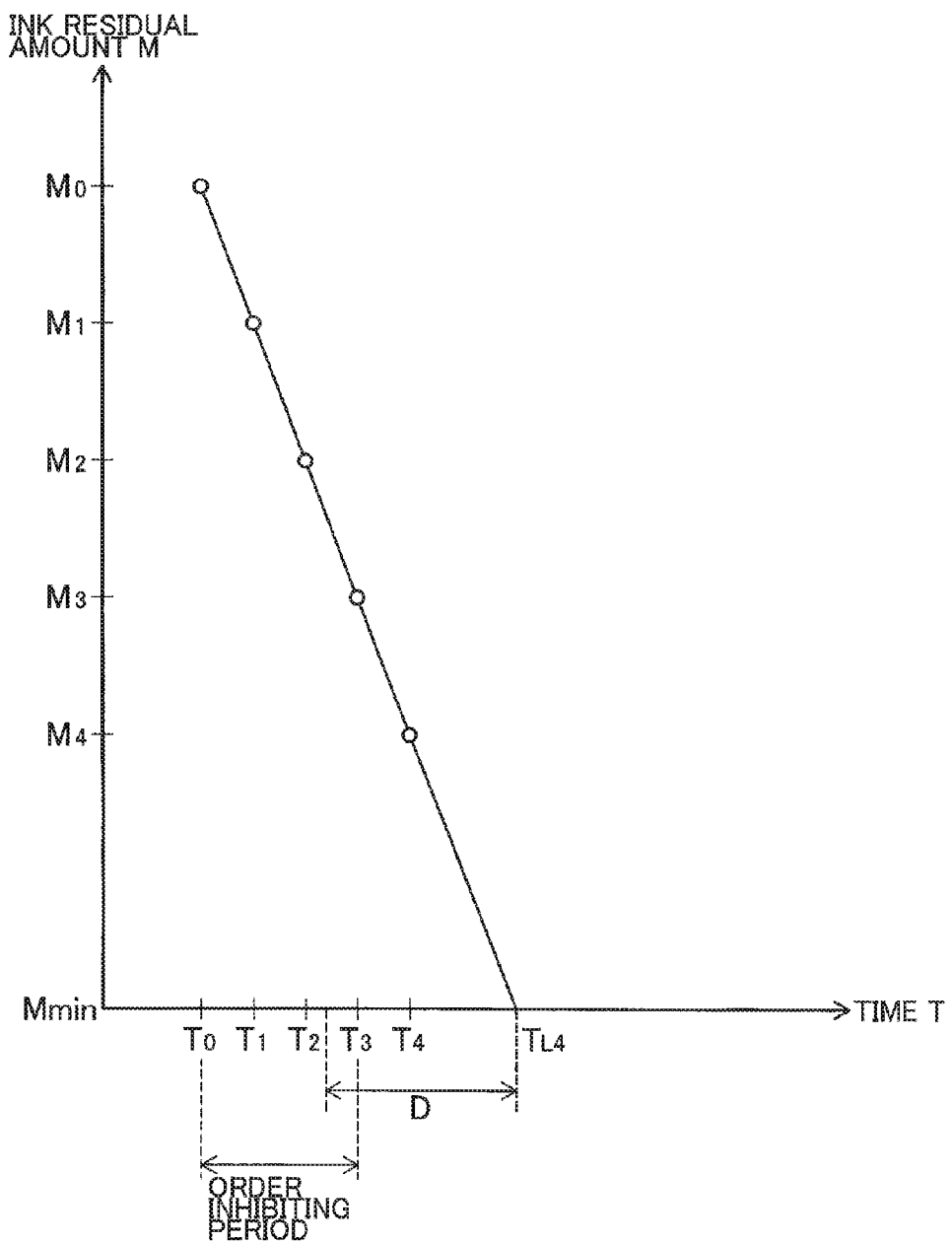

As illustrated in FIG. 7, there may be a case where the ink residual amount continues being reduced during the order inhibiting period after a cartridge 34 was newly connected to the connection section 21 and even after elapse of the order inhibiting period. The information management server 50 performs determination as to the first ordering condition by using the ink information included in the cartridge information that is received after elapse of the order inhibiting period, and determines whether or not to order a new cartridge depending on the determination results. More specifically, within three days after a cartridge 34 was newly connected to the connection section 21, the information management server 50 does not perform determination as to the first ordering condition by using the ink residual amounts $M_1$ to $M_3$. The information management server 50 computes the length of the printable period H based on the ink residual amount $M_4$ that is obtained on the fourth day after the cartridge 34 was newly connected to the connection section 21. Because the thus computed printable period H ($=T_{L4}-T_4$) is shorter than the set period D, the information management server 50 orders a new cartridge on the fourth day after the cartridge 34 was newly connected to the connection section 21.

Even during the order inhibiting period, the information management server 50 performs determination as to the second ordering condition by using the status information included in the received cartridge information. This is because a new cartridge needs to be ordered when the ink residual amount becomes smaller than the threshold value Mx, irrespective of whether the elapsed time from when the presently-connected cartridge 34 was newly connected to the connection section 21 exceeds the order inhibiting period.

In the information management server 50, the CPU 52 executes the control program 60, thereby determining whether at least one of the first and second ordering conditions is satisfied.

Hereinafter, a processing flow of the control program 60 will be described using FIG. 8. That is, details of the determination in M108 and M114 of FIG. 2 will be described using FIG. 8.

When the CPU 52 starts executing the control program 60, the CPU 52 first determines whether or not cartridge information has been received (S100). When cartridge information has not yet been received (NO in S100), processing of S100 is repeated. On the other hand, when cartridge information has been received (YES in S100), the CPU 52 determines whether or not an ordering flag is ON (S102). The ordering flag indicates whether or not an order of a new cartridge has been placed. When the ordering flag is ON, an order of a new cartridge has been placed; on the other hand, when the ordering flag is OFF, an order of a new cartridge has not been placed. The ordering flag is set OFF by default.

When the ordering flag is ON (YES in S102), the CPU 52 determines in S103 whether or not the number of replacement times, which is indicated by the replacement time number information included in the received cartridge information, has changed. When the number of replacement times has changed (YES in S103), the CPU 52 determines that a cartridge 34 has been newly connected to the connection section 21 of the printer 10. So, in S108, the CPU 52 stores the ink information included in the received cartridge information as the reference ink information in the data storage area 62. The CPU 52 also stores time information indicative of the time when the cartridge information was received as the reference time information in the data storage area 62. Then, the CPU 52 sets the ordering flag to OFF (S110), and the processing flow returns to S100. On the other hand, when the number of replacement times has not changed (NO in S103), the processing flow returns to S100. This can prevent the double order of a cartridge from occurring.

On the other hand, when the ordering flag is OFF (NO in S102), the CPU 52 determines whether or not near-empty information has been received, that is, whether or not the status information included in the received cartridge information is near-empty information (S104). When the status information is not near-empty information (NO in S104), that is, when the status information is not-near-empty information, the CPU 52 determines in S106 whether or not the number of replacement times, which is indicated by the replacement time number information included in the received cartridge information, has changed.

When the number of replacement times has changed (YES in S106), the processing flow proceeds to S108 and S110, and then returns to S100.

On the other hand, when the number of replacement times has not changed (NO in S106), the CPU 52 determines whether or not the elapsed time from when the presently-connected cartridge 34 was newly connected to the connection section 21 has exceeded the order inhibiting period (S112). When the elapsed time has not yet exceeded the order inhibiting period (NO in S112), the processing flow returns to S100. On the other hand, when the elapsed time has exceeded the order inhibiting period (YES in S112), the CPU 52 computes the length of the printable period H based on: the reference ink information and reference time information which are presently stored in the data storage area 62; target ink information which has been received in S100 at the latest; and target time information indicative of the reception time of the target ink information (S114). Then, the CPU 52 determines whether or not the length of the printable period H is shorter than the set period D (S116).

When the length of the printable period H is equal to or longer than the set period D (NO in S116), the processing flow returns to S100. On the other hand, when the length of the printable period H is shorter than the set period D (YES in S116), the CPU 52 orders a new cartridge (S118). Then, the CPU 52 sets the ordering flag to ON (S120), and the processing flow returns to S100.

On the other hand, when the status information included in the received cartridge information is the near-empty information (YES in S104), the CPU 52 executes the processing of S118 and subsequent steps.

According to the procedures described above, the length of the printable period H is calculated based on the reference ink information that has been acquired for the first time after occurrence of cartridge replacement and the target ink information that has been acquired after acquisition of the reference ink information. Accordingly, it is possible to adequately calculate the length of the printable period H even though the actual initial state of the cartridge that has been newly connected to the connection section 21 through the cartridge replacement changes. Executing S100 is an example of acquiring use information and an example of acquiring specific information. Executing S104 is an example of receiving excess information. Executing S108 is an example of storing reference use information and reference time information. Executing S114 is an example of computing the length of a first period. Executing S103 is an example of determining whether cartridge replacement has occurred. Executing S106 is another example of determining whether cartridge replacement has occurred. Executing S118 is an example of outputting output information.

<Second Embodiment>

Figure 9:
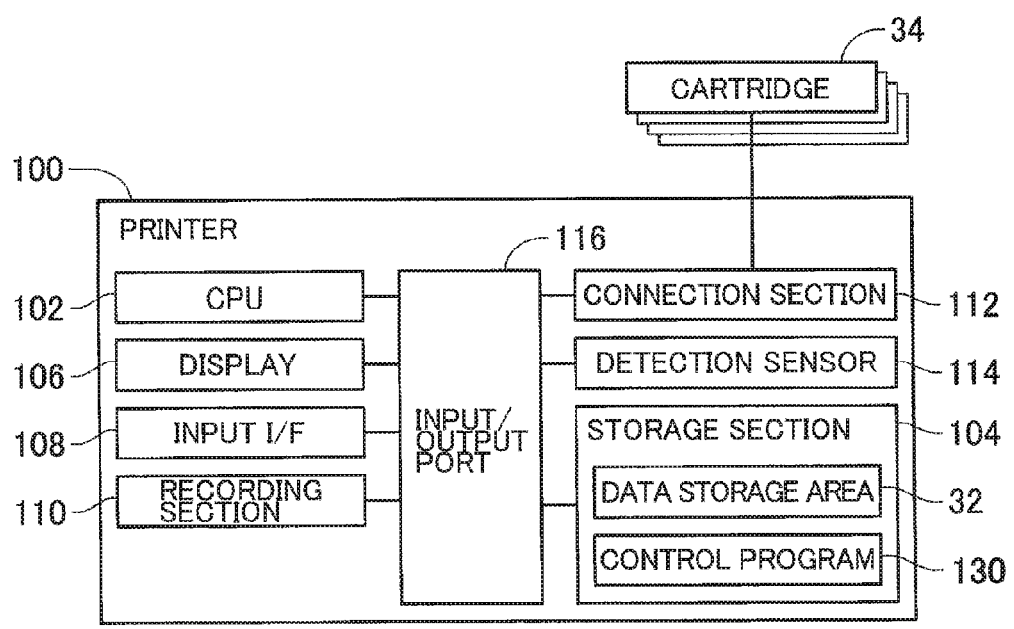
FIG. 9 is a block diagram of a printer according to a second embodiment.

As illustrated in FIG. 9, a printer (an example of a control device) 100 according to a second embodiment mainly includes a CPU (an example of a control section and an example of a computer) 102, a storage section 104 (an example of a non-transitory computer readable storage medium), a display 106, an input interface (input I/F) 108, a recording section (an example of print execution section) 110, a connection section 112 (an example of a connection section), and a detection sensor 114. These components are capable of communicating with one another via an input/output port 116. The CPU 102, the storage section 104, the display 106, the input I/F 108, the recording section 110, the connection section 112, and the detection sensor 114 have the same configurations as those of the CPU 12, storage section 14, display 16, input I/F 18, recording section 20, connection section 21, and detection sensor 22 in the printer 10 of the first embodiment, respectively, so description thereof will be omitted. The storage section 104 has the same configuration as that of the storage section 14 in the printer 10 of the first embodiment, except that a control program 130 is stored in the storage section 104 in place of the control program 30.

In the printer 100 according to the second embodiment, as in the printer 10 of the first embodiment, the ink residual amount is detected by the detection sensor 114 for each color of the ink cartridges 34 that are presently connected to the connection section 112. Accordingly, the ink residual amount of the presently-connected cartridge 34 is repeatedly detected, and information on the detected ink residual amount is supplied to the CPU 102. The CPU 102 counts the number of replacement times, by which cartridge replacement has occurred, based on the detected ink residual amount. The CPU 102 sets the status information to the near-empty information or not-near-empty information based on the detected ink residual amount. Similarly to the first embodiment, the CPU 102 executes the control program 130, thereby determining whether at least one of the first and second ordering conditions is satisfied.

The CPU 102 determines whether or not the first condition is satisfied in a manner described below.

When the CPU 102 determines, based on the number of replacement times of the cartridge 34, that a cartridge 34 was newly connected to the connection section 112, the CPU 102 stores an ink residual amount, which was detected immediately after the connection of the cartridge 34, as reference ink information in the data storage area 32. The CPU 102 also stores information on the time when the ink residual amount was detected, as the reference time information in association with the reference ink information in the data storage area 32. Then, when the ink residual amount was newly detected after storage of the reference ink information and the reference time information, the CPU 102 computes the length of the printable period H based on: the newly detected ink residual amount; the time when the ink residual amount was newly detected; reference ink information stored in the data storage area 32; and the reference time information stored in the data storage area 32. How to compute the printable period H in the second embodiment is the same as that in the first embodiment, so description thereof will be omitted.

Then, after computation of the printable period H, the CPU 102 determines whether or not the length of the printable period H is shorter than the set period D. The set period in the second embodiment differs from that in the first embodiment and is set to a comparatively long period, for example, about one week, irrespective of the length of the delivery period. When the CPU 102 determines that the length of the printable period H is shorter than the set period D, the CPU 102 outputs to the display 106 a near-empty screen display command (an example of output information). As a result, a near-empty screen is displayed on the display 106. The near-empty screen indicates that the ink residual amount has become small. Especially when the near-empty screen is displayed as a result of satisfaction of the first condition, an additional comment is displayed on the near-empty screen to indicate that print processing will be disabled due to ink shortage before and after the set period D will be elapsed. This allows the user to know, at an adequate timing, that print processing will be disabled due to ink shortage within a few days.

As in the first embodiment, the printer 100 also determines whether the second condition is satisfied, by using the status information. More specifically, the CPU 102 sets the status information to the near-empty information or not-near-empty information every time the ink residual amount is detected by the detection sensor 114. When the status information is set to the near-empty information, the CPU 102 outputs the near-empty screen display command to the display 106. As a result, the near-empty screen is displayed on the display 106, allowing the user to know, at an adequate timing, that the ink residual amount has become small.

Further, as in the first embodiment, also in the printer 100, only after the elapsed time from when the cartridge 34 was newly connected to the connection section 112 exceeds a prescribed period, the CPU 102 determines whether the first condition is satisfied.

Figure 8:
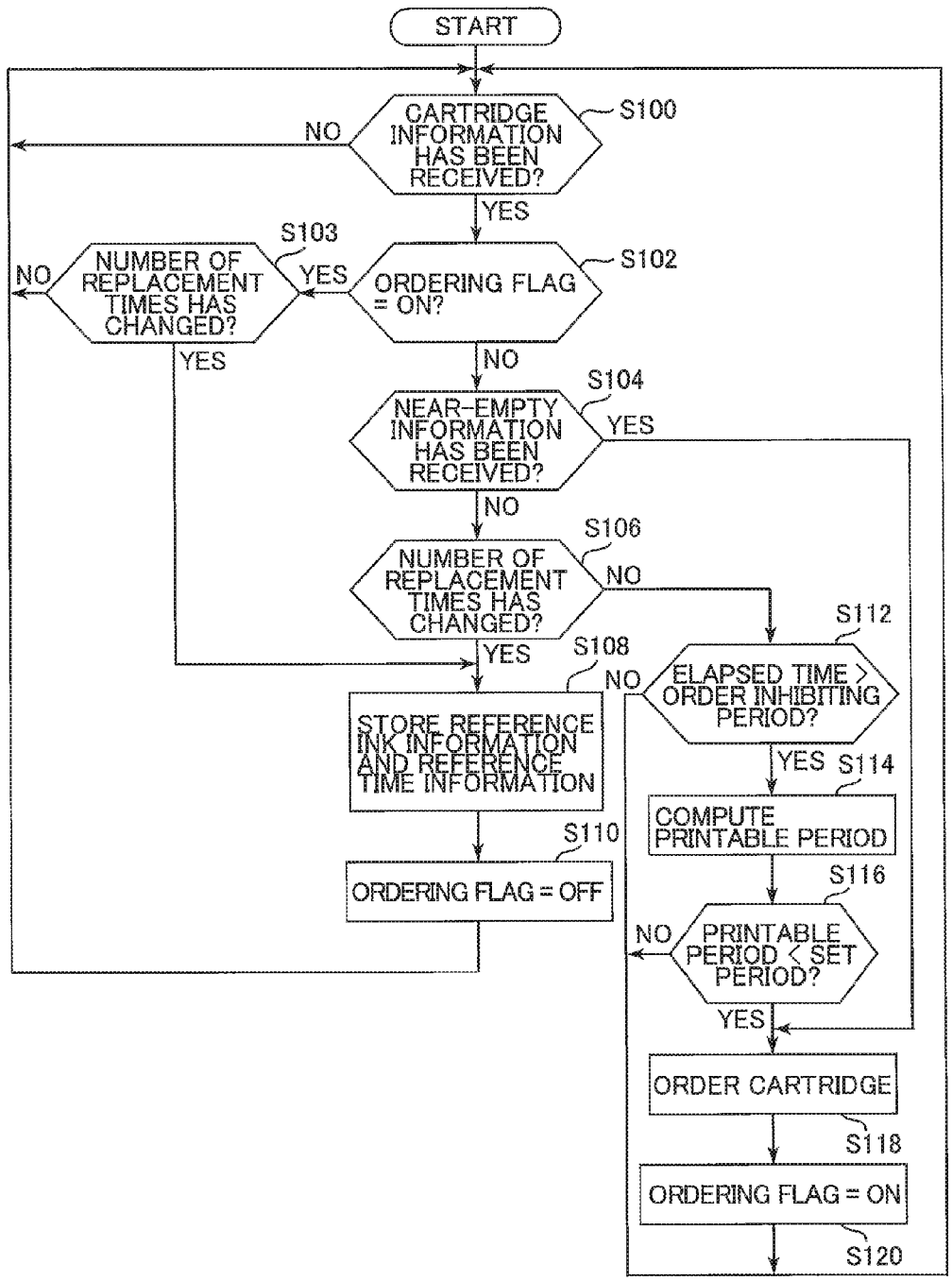
FIG. 8 is a flowchart showing an operation of an information management server provided in the communication system according to the first embodiment.

More specifically, the processing flow of the control program 130 according to the present embodiment is the same as that of the first embodiment shown in FIG. 8 except for the following points:

That is, the processes of S102, S110, and S120 are omitted from the processing flow of the control program 130. In S100, the CPU 102 determines whether or not information on the detected residual ink amount has been received from the detection sensor 114. In S104, the CPU 102 determines to which one of the near-empty information and the not-near-empty information the status information has been set based on the detected residual ink amount. In S108, information on the detected residual ink amount is stored in the data storage area 32 as the reference ink information, and the time when the residual ink amount was detected is stored in the data storage area 32 as the reference time information. In S112, the CPU 102 determines whether or not the elapsed time from when the presently-connected cartridge was newly connected to the connection section 112 has exceeded the prescribed period. In S118, the CPU 102 controls the display 106 to display the near-empty screen. Especially when the process of S118 is executed as a result of the affirmative determination in the process of S116, the near-empty screen is added with the additional comment indicating that print processing will be disabled due to ink shortage before and after the set period D will be elapsed.

While the description has been made in detail with reference to the specific embodiments thereof, it would be apparent to those skilled in the art that various changes and modifications may be made therein without departing from the spirit and scope of the above described embodiments. For example, in the first embodiment, the printer 10 transmits the cartridge information at the predetermined time every day; alternatively, however, in addition to the transmission at the predetermined time, the printer 10 may transmit the cartridge information at a timing when a cartridge is newly connected to the connection section 21.

Further, for example, in the first embodiment, the printer 10 transmits, together with the ink information, the replacement time number information to the information management server 50. Based on the replacement time number information, the information management server 50 determines whether cartridge replacement has occurred in the printer 10. Alternatively, however, when cartridge replacement has been completed, the printer 10 may transmit, to the information management server 50, information indicating that the cartridge replacement has been completed. In such a case, the information management server 50 recognizes that cartridge replacement has been completed in the printer 10, upon receiving the information from the printer 10. Further, the printer 10 may transmit a cartridge unique ID to the information management server 50. In such a case, the information management server 50 recognizes that the cartridge replacement has completed in the printer 10 when the received cartridge ID has changed.

Further, in the first embodiment, the printer 10 determines whether or not the ink residual amount is smaller than the threshold value and transmits the status information corresponding to the results of the determination to the information management server 50. Alternatively, however, the information management server 50 may determine whether or not the ink residual amount is smaller than the threshold value based on the received ink information.

Further, in the first embodiment, the information management server 50 receives the cartridge information directly from the network-connected printer 10. Alternatively, however, the information management server 50 may indirectly receive the cartridge information via a PC or the like. That is, in a configuration where the printer 10 is connected to the PC by USB, LAN, or wireless LAN, the cartridge information of the printer 10 may be transmitted to the information management server 50 via the PC.

Further, in the above-described embodiments, an inkjet type print mechanism is adopted. Alternatively, however, an electrophotographic print mechanism, i.e., a laser printer type print mechanism may be adopted. A toner cartridge is used in the laser printer type print mechanism. In place of the ink information (residual ink amount) used for the ink cartridge, the number of rotations, by which a developing roller disposed in the toner cartridge has been rotated, may be detected and adopted as the use information indicative of the state of use of the toner cartridge. Based on the detected number of rotations of the developing roller, the specific time (usable time limit) when printing is expected to become impossible can be estimated. The printable period H can be computed based on the usable time limit and the time that is defined by the time information indicative of the time when the number of rotations of the developing roller was detected. That is, in place of the ink residual amount used in the above-described embodiments, the usable time limit of the cartridge can be adopted as the use information. Further, for example, in place of the ink residual amount, an ink use amount, by which ink has been used, or an ink use rate, at which the amount of ink has been used, can be used as the use information. Furthermore, the printable period H can be estimated based on a combination of: a toner residual amount, a toner use amount, or a toner use rate; and the number of rotations of the developing roller. As the use information, the residual amount of ink or toner may be used as being roughly classified into "large", "medium", "small" and "near-empty", not represented as a numerical value.

Further, in the first embodiment, the information management server 50 orders a new cartridge when the first or second ordering condition is satisfied, that is, when the near-empty information has been received, or when the printable period H is shorter than the set period D. Alternatively, however, the information management server 50 may order a new cartridge only when the first ordering condition is satisfied, irrespective of whether the second ordering condition is satisfied. That is, the information management server 50 may order a new cartridge only when the printable period H is shorter than the set period D. In other words, the information management server 50 may not order a new cartridge even when the second condition is satisfied, that is, even when the near-empty information has been received.

Further, in the first embodiment, the printer 10 repeatedly transmits the cartridge information to the information management server 50 at the preset timings. Alternatively, however, the printer 10 may transmit the cartridge information at an arbitrary timing when a specific event occurs in the printer 10, not at the preset timing.

Further, in the above-described first embodiment, the information management server 50 is constituted of a single web server; alternatively, the information management server 50 may be constituted of a plurality of web servers.

Further, in the first embodiment, the information management server 50 and the delivery management server 70 are constituted by independent web servers, respectively. Alternatively, however, the information management server 50 and the delivery management server 70 may be constituted by a single web server.

Further, the printer 100 according to the second embodiment determines whether at least one of the first and second conditions is satisfied. When at least one of the first and second conditions is satisfied, the near-empty screen is displayed on the display 106. Alternatively, however, the following configuration may be adopted. That is, the printer 100 may be connected to the delivery management server 70, which is described in the first embodiment, such that the printer 100 is capable of communicating with the delivery management server 70. The printer 100 may determine whether at least one of the first and second conditions is satisfied, and places an order for a new cartridge to the delivery management server 70 when at least one of the first and second conditions is satisfied.

Figure 2:
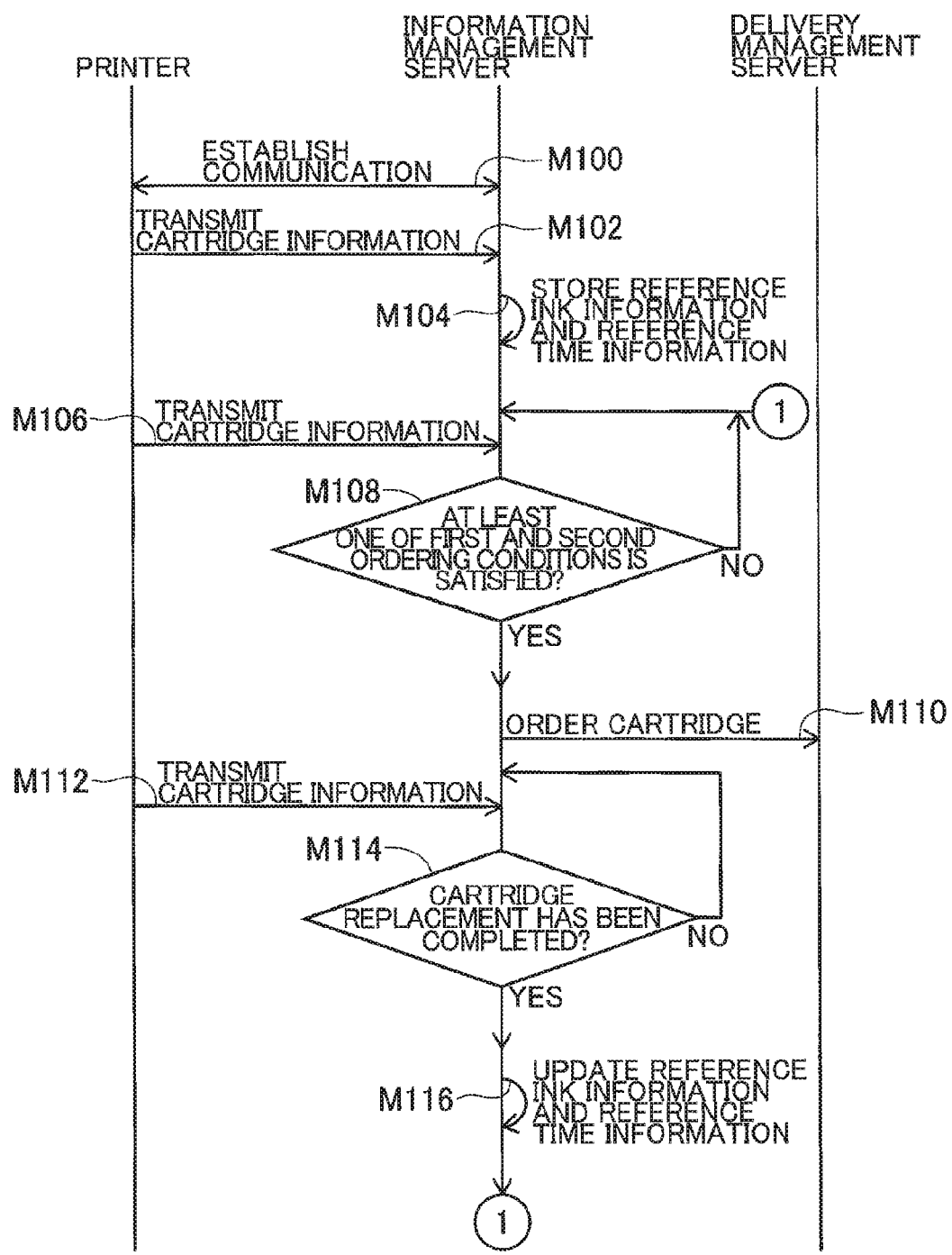
FIG. 2 is a sequence diagram indicating operation of the communication system according to the first embodiment.

Further, in the above-described first embodiment, the CPU 52 executes processing shown in FIGS. 2 and 8; alternatively, these processing may be executed by an ASIC or another logic integrated circuit or may be executed by cooperation of a CPU, an ASIC, and another logic integrated circuit.

What is claimed is:

1. A non-transitory computer readable storage medium storing a set of program instructions for a control device, the program instructions, when executed by a computer provided in the control device, causing the control device to perform:
   repeatedly acquiring use information indicative of a state of use of a cartridge that is presently connected to a connector so as to be used by a printing execution section, the cartridge being configured to accommodate printing agent therein, the printing execution section being configured to execute printing by using the printing agent accommodated in the presently-connected cartridge;
   acquiring specific information from a supply source of the acquired use information, the specific information being used for determining whether cartridge replacement has occurred;
   determining, by using the acquired specific information, whether cartridge replacement has occurred;
   when it is determined that cartridge replacement has occurred, storing, in a storage section, reference use information and reference time information in association with each other, the reference use information being use information that is acquired for the first time after the cartridge replacement has occurred, the reference time information being indicative of a time when the reference use information is acquired;
   after a length of an elapsed time, which is defined as being elapsed from the time indicated by the reference time information stored in the storage section, has become longer than a length of an output inhibition period, every time when target use information is acquired, computing a length of a first period, the target use information being use information that is acquired after the reference use information is acquired, the first period being defined as a period of time defined from a particular time until printing by the printing execution section using the printing agent in the presently-connected cartridge is estimated to become impossible, the length of the first period being computed based on the target use information, target time information, the reference use information that is stored in the storage section, and the reference time information that is stored in the storage section, the target time information being indicative of a time when the target use information is acquired; and
   when the length of the first period is shorter than a length of a first set period, outputting output information corresponding to the state of use of the presently-connected cartridge.

2. The non-transitory computer readable storage medium according to claim 1, wherein the output information is outputted also when the state of use of the presently-connected cartridge exceeds a prescribed use limit even when the length of the first period is longer than the length of the first set period and even when the length of the elapsed time is shorter than or equal to the length of the output inhibition period.

3. The non-transitory computer readable storage medium according to claim 2,
   wherein the control device is configured to communicate with a printing device that is provided with the printing execution section and the connector,
   wherein the program instructions, when executed by the computer provided in the control device, cause the control device to further perform receiving, from the printing device, excess information indicating that the state of use of the presently-connected cartridge exceeds the prescribed use limit, and
   wherein when the excess information is received, the output information is outputted, irrespective of whether the length of the first period is shorter than the first set period and irrespective of whether the length of the elapsed time is shorter than or equal to the length of the output inhibition period.

4. The non-transitory computer readable storage medium according to claim 1,
   wherein the specific information indicates a number of replacement times at which cartridge replacement has occurred, and
   wherein when the number of replacement times indicated by the specific information has changed, it is determined that cartridge replacement has occurred.

5. The non-transitory computer readable storage medium according to claim 1,
   wherein a coordinate system is defined by a numerical value and a time, the numerical value representing the state of use of the presently-connected cartridge that is indicated by the acquired use information, the time representing when the use information is acquired, and
   wherein the first period is computed by using a linear function that passes through both of: a coordinate point represented by the reference use information and the reference time information; and another coordinate point represented by the target use information and the target time information.

6. The non-transitory computer readable storage medium according to claim 1,
   wherein the control device is configured to communicate with a delivery management server that is configured to perform a process for receiving an order of a cartridge and arranging dispatch of the cartridge to a user who desires to control the printing execution section to execute printing, and
   wherein information on ordering of a cartridge is transmitted as the output information to the delivery management server.

7. The non-transitory computer readable storage medium according to claim 1,
   wherein the control device is a server device configured to communicate with a printing device that is provided with the printing execution section and the connector,
   wherein the use information is received from the printing device, and
   wherein the specific information is received from the printing device.

8. The non-transitory computer readable storage medium according to claim 7, wherein the use information and the specific information are acquired from the printing device in a single communication session.

9. The non-transitory computer readable storage medium according to claim 1, wherein the use information includes information on an amount of printing agent accommodated in the presently-connected cartridge.

10. The non-transitory computer readable storage medium according to claim 1, wherein the particular time is the time indicated by the target time information.

11. A non-transitory computer readable storage medium storing a set of program instructions for a control device, the program instructions, when executed by a computer provided in the control device, causing the control device to perform:

acquiring use information indicative of a state of use of a cartridge that is presently connected to a connector so as to be used by a printing execution section, the cartridge being configured to accommodate printing agent therein, the printing execution section being configured to execute printing by using the printing agent accommodated in the presently-connected cartridge;

acquiring specific information from a supply source of the acquired use information, the specific information being used for determining whether cartridge replacement has occurred;

determining, by using the acquired specific information, whether cartridge replacement has occurred;

when it is determined that cartridge replacement has occurred, storing, in a storage section, reference use information and reference time information in association with each other, the reference use information being use information that is acquired for the first time after the cartridge replacement has occurred, the reference time information being indicative of a time when the reference use information is acquired;

when target use information is acquired, computing a length of a first period, the target use information being use information that is acquired after the reference use information is acquired, the first period being defined as a period of time defined from a particular time until printing by the printing execution section using the printing agent in the presently-connected cartridge is estimated to become impossible, the length of the first period being computed based on the target use information, target time information, the reference use information that is stored in the storage section, and the reference time information that is stored in the storage section, the target time information being indicative of a time when the target use information is acquired;

when the length of the first period is shorter than a length of a first set period, outputting output information corresponding to the state of use of the presently-connected cartridge, even when the state of use of the presently-connected cartridge does not exceed a prescribed use limit; and when the state of use of the presently-connected cartridge exceeds the prescribed use limit, outputting output information corresponding to the state of use of the presently-connected cartridge, even when the length of the first period is longer than the first set period.

12. The non-transitory computer readable storage medium according to claim 11,
wherein the control device is configured to communicate with a printing device that is provided with the printing execution section and the connector,
wherein the program instructions, when executed by the computer provided in the control device, cause the control device to further perform receiving, from the printing device, excess information indicating that the state of use of the presently-connected cartridge exceeds the prescribed use limit, and
wherein when the excess information is received, the output information is outputted, even when the length of the first period is longer than the first set period.

13. The non-transitory computer readable storage medium according to claim 11, wherein the length of the first period is computed after a length of an elapsed time, which is defined as being elapsed from the time indicated by the reference time information stored in the storage section, has become longer than a length of an output inhibition period.

14. The non-transitory computer readable storage medium according to claim 11,
wherein the specific information indicates a number of replacement times at which cartridge replacement has occurred, and
wherein when the number of replacement times indicated by the specific information has changed, it is determined that cartridge replacement has occurred.

15. The non-transitory computer readable storage medium according to claim 11,
wherein a coordinate system is defined by a numerical value and a time, the numerical value representing the state of use of the presently-connected cartridge that is indicated by the acquired use information, the time representing when the use information is acquired, and
wherein the first period is computed by using a linear function that passes through both of: a coordinate point represented by the reference use information and the reference time information; and another coordinate point represented by the target use information and the target time information.

16. The non-transitory computer readable storage medium according to claim 11,
wherein the control device is configured to communicate with a delivery management server that is configured to perform a process for receiving an order of a cartridge and arranging dispatch of the cartridge to a user who desires to control the printing execution section to execute printing, and
wherein information on ordering of a cartridge is transmitted as the output information to the delivery management server.

17. The non-transitory computer readable storage medium according to claim 11,
wherein the control device is a server device configured to communicate with a printing device that is provided with the printing execution section and the connector,
wherein the use information is received from the printing device, and
wherein the specific information is received from the printing device.

18. The non-transitory computer readable storage medium according to claim 17, wherein the use information and the specific information are acquired from the printing device in a single communication session.

19. The non-transitory computer readable storage medium according to claim 11, wherein the use information includes information on an amount of printing agent accommodated in the presently-connected cartridge.

20. The non-transitory computer readable storage medium according to claim 11, wherein the particular time is the time indicated by the target time information.

21. A control device comprising:
a storage section; and
a controller configured to perform:
repeatedly acquiring use information indicative of a state of use of a cartridge that is presently connected to a connector so as to be used by a printing execution section, the cartridge being configured to accommodate printing agent therein, the printing execution section being configured to execute printing by using the printing agent accommodated in the presently-connected cartridge;
acquiring specific information from a supply source of the acquired use information, the specific information being used for determining whether cartridge replacement has occurred;

determining, by using the acquired specific information, whether cartridge replacement has occurred;

when it is determined that cartridge replacement has occurred, storing, in the storage section, reference use information and reference time information in association with each other, the reference use information being use information that is acquired for the first time after the cartridge replacement has occurred, the reference time information being indicative of a time when the reference use information is acquired;

after a length of an elapsed time, which is defined as being elapsed from the time indicated by the reference time information stored in the storage section, has become longer than a length of an output inhibition period, every time when target use information is acquired, computing a length of a first period, the target use information being use information that is acquired after the reference use information is acquired, the first period being defined as a period of time defined from a particular time until printing by the printing execution section using the printing agent in the presently-connected cartridge is estimated to become impossible, the length of the first period being computed based on the target use information, target time information, the reference use information that is stored in the storage section, and the reference time information that is stored in the storage section, the target time information being indicative of a time when the target use information is acquired; and when the length of the first period is shorter than a length of a first set period, outputting output information corresponding to the state of use of the presently-connected cartridge.

22. The control device according to claim 21, wherein the particular time is the time indicated by the target time information.

\* \* \* \* \*